Figure 3:
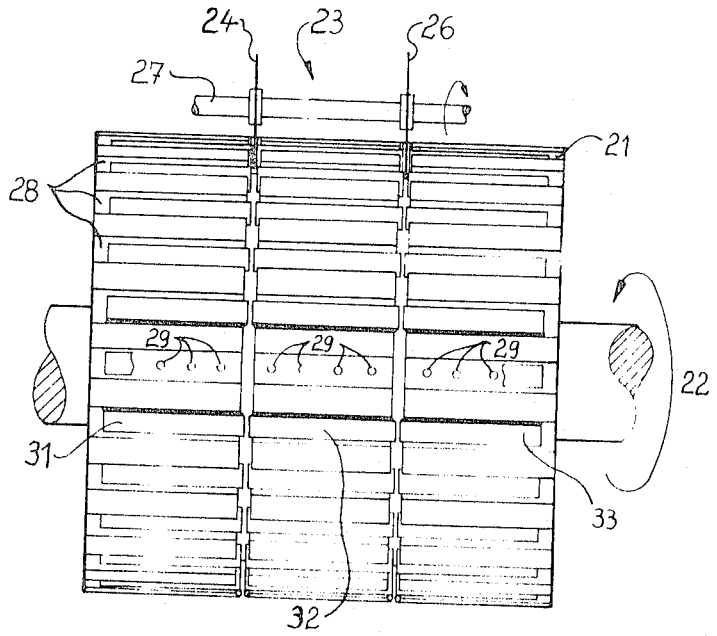
Figure 4:
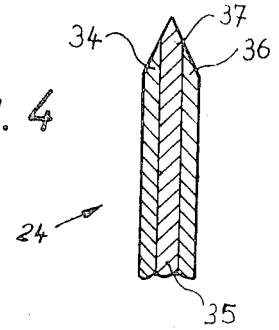

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 14, 1971

893 O.G. 402

T893,006

BLADE FOR CUTOFF DEVICES IN TOBACCO PROCESSING MACHINES AND METHOD OF MAKING THE SAME

Fritz Wenninger, Mechanicsville, Va., assignor to Hauni-Werke Korber & Co. KG, Hamburg, Germany

Filed Dec. 3, 1970, Ser. No. 94,789

**Int. Cl. B26d *1/12***

U.S. Cl. 83—663

2 Sheets Drawing. 17 Pages Specification

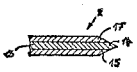

The blade of a cutoff device or severing device for wrapped tobacco or filter rods, particularly for severing of filter rods, is a one-piece body consisting of chromium steel or another steel alloy and having a relatively hard layer and one or two softer outer layers. The hard layer has a sharply defined wedge-shaped cutting edge which extends beyond the softer layer or layers. The imparting of different hardnesses to the layers of the blade can be carried out in a vacuum furnace by changing the texture of the material of a steel blank. The softer outer layer or layers reduce the likelihood of breakage or cracking and enhance the elasticity of the blade. A sickle-shaped blade is preferred for use in cutoff devices which serve to sever wrapped tobacco or filter rods while the rods move axially, and a disk-shaped blade is preferred for severing of wrapped tobacco or filter rods which move sideways. The blade can be used for extended periods of time without any sharpening or with grinding at infrequent intervals.

Dec. 14, 1971 F. WENNINGER T893,006
BLADE FOR CUTOFF DEVICES IN TOBACCO PROCESSING MACHINES AND METHOD OF MAKING THE SAME
Filed Dec. 3, 1970 2 Sheets-Sheet 1
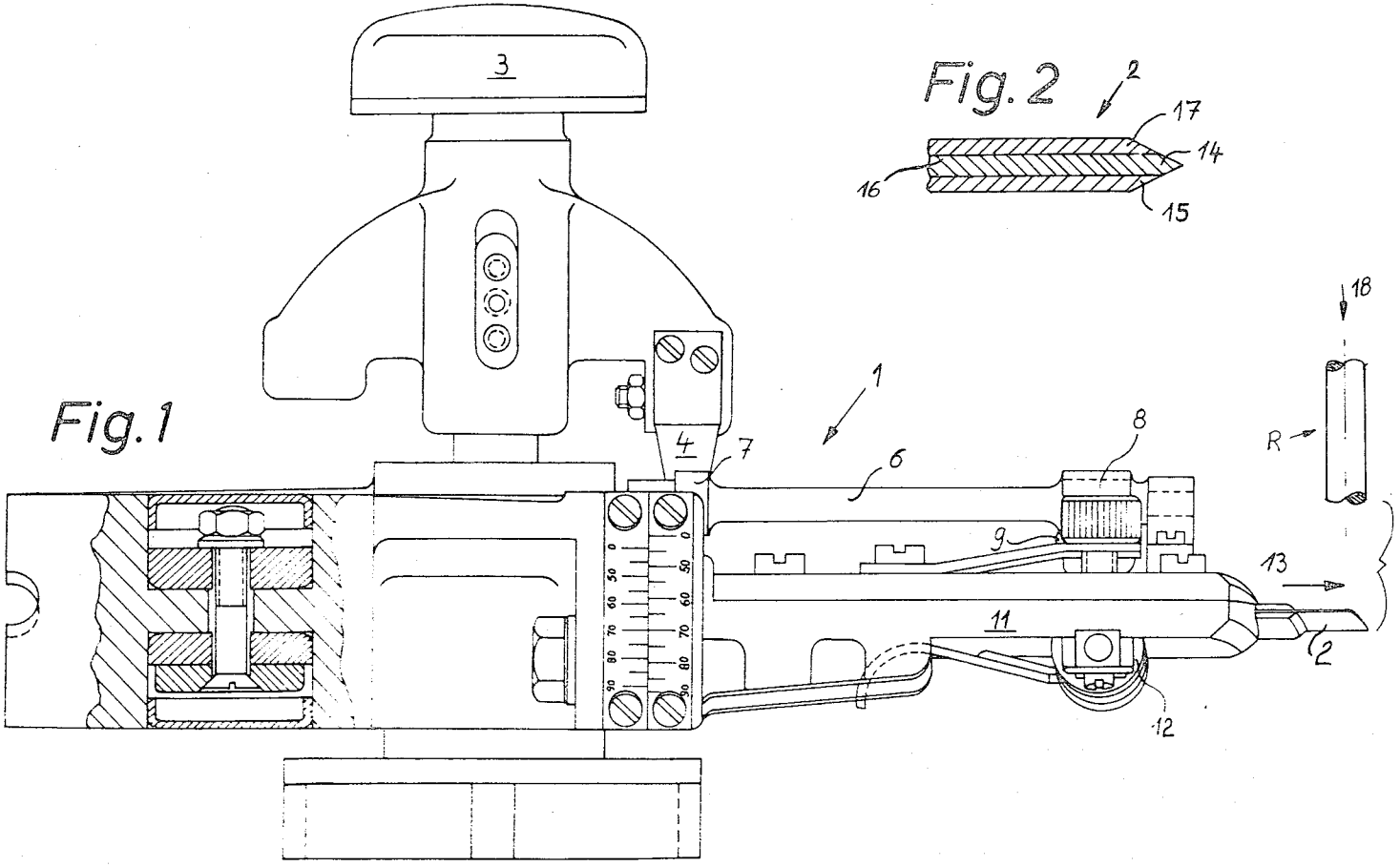
INVENTOR:
FRITZ WENNINGER
By: [illegible]
Attorney

INVENTOR:
FRITZ WENNINGER

By: [illegible]
Attorney